US008005721B2

United States Patent
Azor et al.

(10) Patent No.: US 8,005,721 B2
(45) Date of Patent: Aug. 23, 2011

(54) SYSTEMS AND METHODS FOR MULTI-PROVIDER CONTENT-ON-DEMAND RETRIEVAL

(75) Inventors: Frank Christopher Azor, Miami, FL (US); Darek Kaminski, Pembroke Pines, FL (US)

(73) Assignee: Dell Products L.P., Round Rock, TX (US)

( * ) Notice: Subject to any disclaimer, the term of this patent is extended or adjusted under 35 U.S.C. 154(b) by 731 days.

(21) Appl. No.: 11/899,565

(22) Filed: Sep. 6, 2007

(65) Prior Publication Data
US 2009/0070231 A1  Mar. 12, 2009

(51) Int. Cl.
*G06Q 30/00* (2006.01)
(52) U.S. Cl. ...................... 705/26.1; 705/27.1
(58) Field of Classification Search ............. 705/26, 705/27
See application file for complete search history.

(56) References Cited

U.S. PATENT DOCUMENTS

| | | | |
|---|---|---|---|
| 5,745,710 A | 4/1998 | Clanton, III et al. | 395/327 |
| 6,622,148 B1 | 9/2003 | Noble et al. | 707/104.1 |
| 6,859,799 B1 | 2/2005 | Yuen | 707/3 |
| 7,194,698 B2 | 3/2007 | Gottfurcht et al. | 715/811 |
| 7,200,586 B1 | 4/2007 | Deguchi et al. | 707/3 |
| 2005/0229220 A1* | 10/2005 | Fisher et al. | 725/89 |
| 2007/0039023 A1* | 2/2007 | Kataoka | 725/46 |
| 2007/0244902 A1* | 10/2007 | Seide et al. | 707/10 |

OTHER PUBLICATIONS

MSN TV, "*Broadband Setup Guide*," 2006, Microsoft Corporation.
MSN TV, "*Hardware Details*," May 2007, Microsoft Corporation.
Movielink, "*Movielink-Downloads*," May 2007.
Movielink, "*Movielink-Help*," May 2007.
Windows XP, "*Windows XP Media Center Edition 2005: Features*," May 2007.
Press Release, "*Microsoft and Industry Partners Deliver on Digital Entertainment Anywhere Vision With Windows XP Media Center Edition 2005*," Oct. 12, 2004, Microsoft Corporation.
Windows Marketplace, "*Product Details for My Movies*," May 2007, Microsoft Corporation.
Windows Marketplace: Screen Image, May 2007.

* cited by examiner

*Primary Examiner* — Jeffrey A Smith
*Assistant Examiner* — Courtney Stopp
(74) *Attorney, Agent, or Firm* — O'Keefe, Egan, Peterman & Enders, LLP (57) ABSTRACT

Systems and methods for retrieving multi-provider on-demand content through a common portal device are disclosed. The techniques described herein allow for multi-provider media content to be made available for retrieval to a user through a streamlined process thereby enhancing the user experience and likelihood of ordering on-demand content.

17 Claims, 4 Drawing Sheets

SYSTEMS AND METHODS FOR MULTI-PROVIDER CONTENT-ON-DEMAND RETRIEVAL

TECHNICAL FIELD

The techniques described herein relate to systems and methods for accessing on-demand media content and, more particularly, to systems and methods for content-on-demand (COD) retrieval from network accessible content providers.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are used to locate and retrieve media content from content providers in an on-demand fashion. Content providers can include satellite television providers, cable television providers, Internet-based providers and/or other content providers that have content available for download through one or more network connections. Current content-on-demand (COD) retrieval and delivery systems for providing on-demand media content to a user are known. However, with current systems, a user's search for on-demand content centers on the content-provider and, therefore, is not user-centric. As such, these systems are inefficient and non-desirable from a user's perspective thereby limiting the likelihood a user will take advantage of COD offerings.

Some online content providers allow users to search for content available in the content libraries for the particular content provider. As such, if content meeting a user's search terms is not part of a current provider's content library, the user is unable to identify or retrieve that content. Examples of such content providers are cable television and satellite television subscription services. Typically, the only Video-On-Demand (VOD) options available for consumers on the television (TV) are these cable or satellite subscriptions. However, to use these VOD services, a user must first rent the settop receivers associated with the particular provider, and the user is then limited to the content databases provided specifically by the user's cable or satellite provider. Time, Cox, Brighthouse, Comcast, and Cablevision are example cable TV providers that limit the VOD or COD content to just their offerings. Similarly, AT&T Satellite is an example satellite provider that limits the VOD or COD content to its offerings.

Other content providers that allow access to multiple content providers nevertheless force consumers to select a content provider before starting a search for content. In this case, the provider may not have the content desired by the user, resulting in wasted time for the search with that provider, and no delivery of the desired content. An example of such a content provider is the Online Spotlight feature available using the Microsoft Media Center operating system. Using this feature, consumers first pick a content provider before then starting their search for content. This process is inefficient because the content desired by the user may not be available with the content provider that the user picked from the Online Spotlight main menu.

Another method of accessing media on-demand content involves downloading content to a user's personal computer (PC) and/or laptop computer, for example, through the Internet. Through this manual process, a user accesses the Internet through a computer, selects a website for a content provider, conducts a search on that specific website, and then orders from that specific website. Once the content is ordered and paid for, the user can then download the content to the computer for replay. Unfortunately, using a typical computer interface, a user is within approximately two feet of the monitor for the computer. This two-foot interface is not optimal for watching content in a living room or other large room.

For some systems, a television can be used as a display device for a computer system. In particular, the television can be used as the output device for a computerized system that is made for viewing Internet content through a television. An example of such a system is the MSN TV Internet Media Player. Connecting the output of this device to a television, the user can use the television as the display device for navigating the Internet and accessing websites.

SUMMARY

Systems and methods for identifying and retrieving multi-provider on-demand content through a portal device are disclosed. The techniques described herein allow for multi-provider media content to be made available for retrieval to a user through a streamlined process thereby enhancing the user experience and likelihood of ordering content-on-demand (COD). The disclosed systems and methods provide a user-centric online content search capabilities wherein the user can locate content available across multiple online content providers. In addition, the user can be allowed to control search, selection, and playback of the desired media content through a television in a typical living room or large room setting.

In one embodiment, a method is disclosed for providing multi-provider media content to a user. The method includes displaying a search interface to a user on a local display screen, receiving search terms from a user, accessing media content databases from a plurality of media content providers through an Internet connection, searching the media content databases using the search terms, obtaining search results from the providers concerning orderable media content items for the search terms, aggregating the search results, displaying at least one selectable option for orderable media content items, receiving a user selection of one of the options, downloading media content through the Internet from one of the media content providers based upon the user selection, and displaying playback for the downloaded media content based upon user control of the playback. As described below, other features and variations can be implemented, if desired, and a related methods and systems can be utilized, as well.

In another embodiment, a portal system is disclosed for providing multi-provider media content to a user. The portal system can include a user interface module, a search module, and a content delivery module to facilitate the operations of the portal system in identifying and retrieving on-demand content through network available content providers. The portal system can also comprise a transaction module configured to process transactions for orders from the user for media content items, and this transaction module can operate without requiring the user to interact directly with the content provider, if desired. As described below, other features and variations can be implemented, if desired, and a related methods and systems can be utilized, as well.

DESCRIPTION OF THE DRAWINGS

It is noted that the appended drawings illustrate only exemplary embodiments of the techniques described herein and are, therefore, not to be considered limiting of its scope, for the invention may admit to other equally effective embodiments.

DETAILED DESCRIPTION OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

As indicated above, some information handling systems are used to locate and retrieve media content from content providers in an on-demand fashion. The systems and methods described herein allow users to locate and retrieve on-line multi-provider on-demand media content through a common portal system. Although the embodiments described below are directed to a living room or large room environment including a television as the primary display device, the systems and methods described herein can be used in other environments with other display devices, as well.

Figure 1:
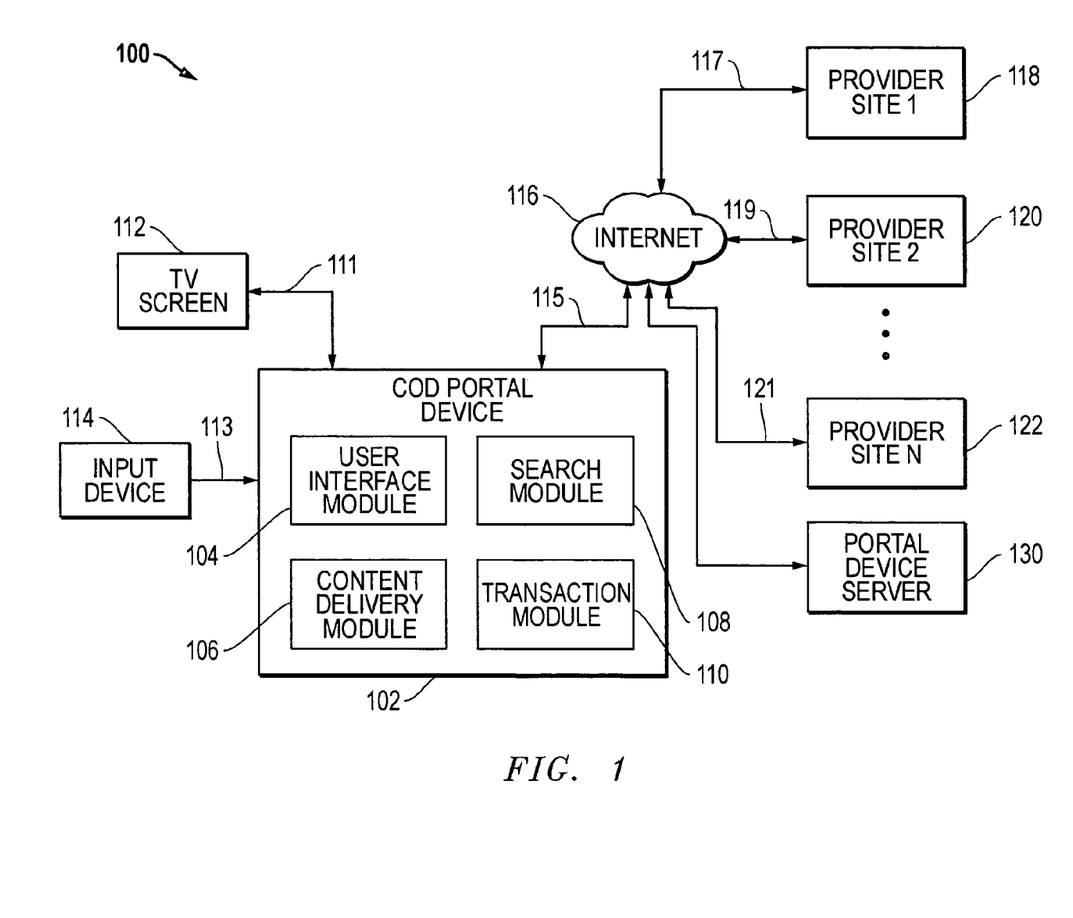
FIG. 1 is an example block diagram of a portal system for providing multi-provider media content to a user.

FIG. 1 is an example block diagram of a portal system 100 for providing multi-provider media content to a user. As depicted a television (TV) is used as the display device. The TV has a local display screen or TV screen 112, and this TV screen 112 is coupled through connections 111 to a content-on-demand (COD) portal system or COD portal device 102. The connections 111 can be one or more wired and/or wireless connections, as desired. As depicted, the COD portal device 102 includes user interface module 104, search module 108, content delivery module 106, and transaction module 110. It is again noted that the display screen 112 can be implemented using any desired display device.

The COD portal device 102 is also coupled to the Internet 116 through wired or wireless connections 115. Although the COD portal device 102 can be directly coupled to the Internet 116, it is noted that the COD portal device 102 would typically be coupled to the Internet 116 through one or more intermediate systems. For example, in a typical home or small business environment, a broadband Internet connection from a server system hosted by an Internet service provider is often first received by a broadband modem and then distributed within the home or small business using local area network (LAN) connections. In such an environment, therefore, the COD portal device 102 would be coupled to the Internet 116 through wired or wireless connections to a broadband modem which is in turn coupled to a broadband service provider to provide Internet access to the COD portal device 102.

As depicted, a plurality of media content provider websites 118 (PROVIDER SITE 1), 120 (PROVIDER SITE 2) ... 122 (PROVIDER SITE N) are also coupled to the Internet 116 through wired and/or wireless connections 117, 119 ... 121. Typically, websites will be hosted by one or more server systems that are coupled to the Internet directly or through one or more other intermediate systems. As with the COD portal device 102, these server systems can be coupled to the Internet though LAN connections and a broadband connection system. The media content provider websites 118 (PROVIDER SITE 1), 120 (PROVIDER SITE 2) ... 122 (PROVIDER SITE N) have databases of downloadable media content that can be accessed through the Internet 116. The media content can be any desired media content, such as voice, music, video, images, mixed media (video/music/text), etc., and is typically stored in a digital format.

The user interface module 104 is used to interface with the user. For example, the user interface module 104 receives user input through an input device 114, and the user interface module 104 provides viewable dialog information to the user through the local display TV screen 112. The input device 114 is coupled to the COD portal device 102 through connections 113, which can be one or more wired or wireless connections, as desired. For ease of use, the input device 114 can be a wireless remote connected to the COD portal device 102 through some wireless protocol.

The search module 108 facilitates searching of media content databases from a plurality of media content provider websites 118 (PROVIDER SITE 1), 120 (PROVIDER SITE 2) ... 122 (PROVIDER SITE N) through the Internet 116. As discussed in more detail below, the search module 108 aggregates search results from the plurality of websites into user selectable options for orderable media content items. This aggregation greatly simplifies the identification, access and ordering process for the user when accessing downloadable media content from the plurality of media content provider websites 118 (PROVIDER SITE 1), 120 (PROVIDER SITE 2) . . . 122 (PROVIDER SITE N).

The content delivery module 106 facilitates downloading the media content through the Internet 116 depending upon a user selection of the orderable media content item. The content can be downloaded and stored on a hard disk or memory (e.g., volatile memory or non-volatile memory) associated with the COD portal device 102. Once downloaded, the content delivery module 106 can also be used to help control the display or playback of the downloaded media content on a local display TV screen 112. In addition, the user can be allowed to control playback of the media content through the input device 114 (e.g., pause, play, fast-forward, reverse, etc.).

The transaction module 110 can be used to process user transactions for orders for media content items from the provider websites. In this way, the user transactions can be processed by the transaction module 110 without requiring a user to interact separately with the content provider websites 118 (PROVIDER SITE 1), 120 (PROVIDER SITE 2) . . . 122 (PROVIDER SITE N). In one alternative, the transaction module 110 can send to the content providers the user information related to ordered content, and the transaction can be further processed between the user and the content provider for the selected website. It is further noted that other transaction processes could also be used while still taking advantage of the multi-vendor COD portal device 102.

As further depicted in FIG. 1, a portal device server 130 can also be provided, if desired. The portal device server 130 can be used to provide a centralized interface between COD portal devices 102 distributed and the third-party content providers. In addition, the search, content delivery and/or transaction processing can be facilitated, if desired, by the portal device server 130. Using this implementation, the portal device server 130 can provide a more efficient technique for managing the portal devices, particularly when they are distributed among a large number of disparate users. One example of such an environment is where a large number of COD portal devices are installed in homes and the content providers are Internet-based content providers. The portal device server 130 can help facilitate the interactions between individual COD portal devices and the Internet-based content providers. In addition, the portal device server 130 can facilitate software upgrades or updates for the COD portal devices, in the event that such upgrades or updates are needed or requested.

Figure 2:
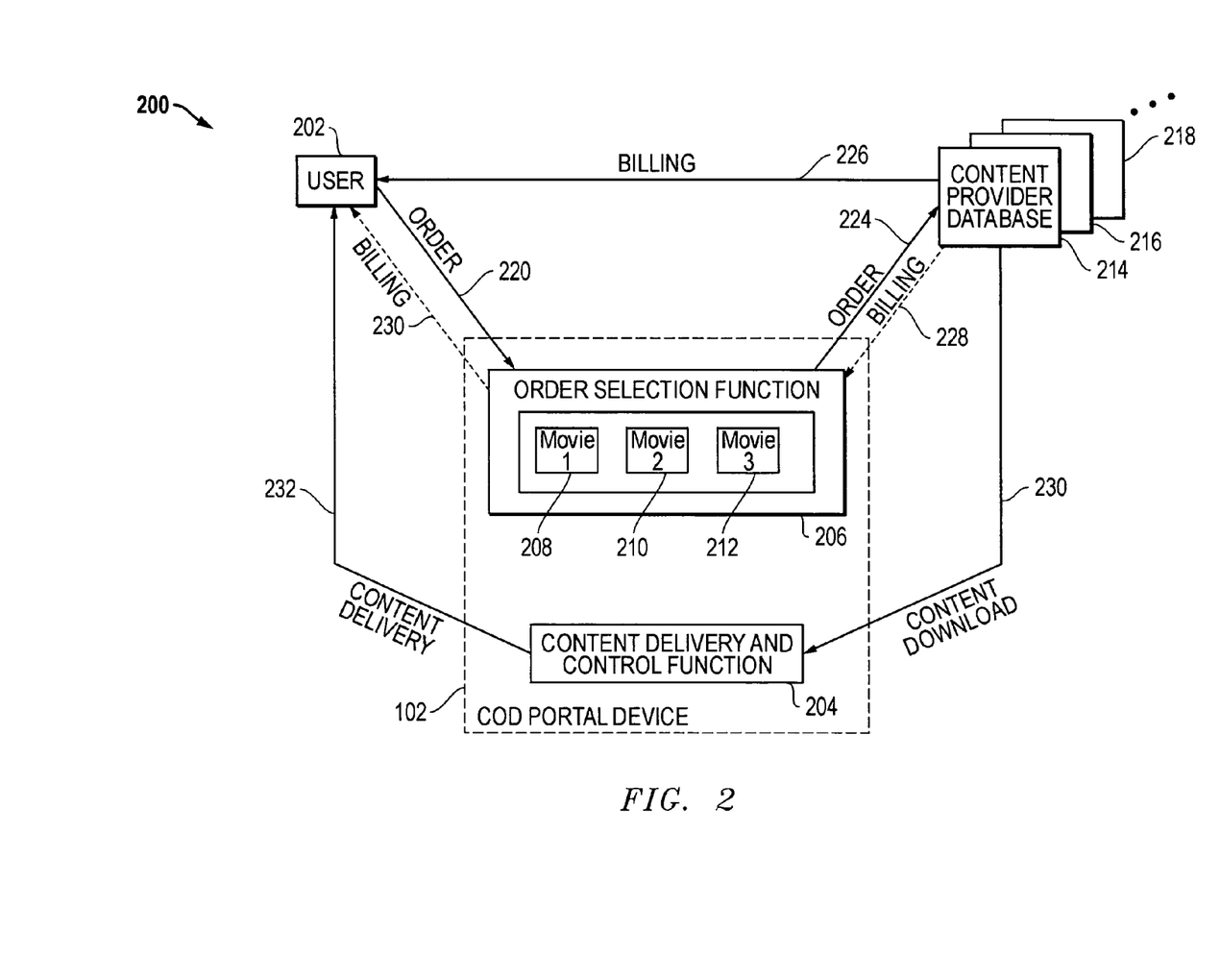
FIG. 2 is an example block diagram of an order selection environment for locating and ordering multi-provider content through a portal system.

FIG. 2 shows an example order selection environment 200 for a multi-provider media content and retrieval system. For the example depicted, it is assumed that the user 202 has conducted a search for downloadable movie content residing in content provider databases 214, 215, 216 . . . associated with the media content provider websites. The COD portal device 102 has accessed a plurality of websites to identify downloadable content satisfying the search terms. As depicted, three movies 208 (MOVIE 1), 210 (MOVIE 2) and 212 (MOVIE 3) have been identified and are displayed to the user 202 as selectable items.

The order selection function 206 for the portal device 102 allows the selection and ordering of the downloadable content by the user. As described herein, the content items 208 (MOVIE 1), 210 (MOVIE 2) and 212 (MOVIE 3) resulting from the user's search are depicted to the user 202 for user selection. The user 202 selects, for example, movie 208 (MOVIE 1) through order action 220 (ORDER). This order action 220 (ORDER) can occur, for example, through the use of input device 114. Once the user 202 makes the order selection, the portal device 102 relays that order request to the appropriate content provider through order action 224 (ORDER). With respect to FIG. 1, the user interface module 104, the search module 108 and the transaction module 110 can be involved in the order selection function 206, if desired.

The content delivery and control function 204 for the COD portal device 102 is then used for the content delivery. The ordered content is delivered from the content provider database, such as content provider database 214, through content download action 230 (CONTENT DOWNLOAD) to the COD portal device 102. The COD portal device 102 then helps to manage the delivery and playback of the downloaded content to the user 202 through content delivery action 232 (CONTENT DELIVERY) With respect to FIG. 1, the user interface module 104 and the content delivery module 106 can be involved in the content delivery and control function 204, if desired.

The order selection function 206 can also facilitate the billing process for the order transaction. The order transaction is processed for the media content items 208, 210 and 212 selected by the user 202. In one embodiment, this processing occurs without requiring the user 202 to interact directly with the content providers that are managing the database 214, 216, 218 . . . . . In such a case, the content provider sends billing information represented by billing action 228 (BILLING) to the COD portal device 102. The COD portal device 102 then handles billing by interfacing with the user 202 through billing action 230 (BILLING). With respect to FIG. 1, the transaction module 110 in the portal device 102 can be involved in this billing process. If desired, the user billing for downloaded content may be part of a single invoice associated with the COD portal device 102 and services provided by or through this COD portal device 102. In one alternative, the billing is managed separately from the COD portal device 102 through one or more interactions represented by billing action 226 (BILLING). For example, the content provider could send an invoice directly to the user based upon user information provided by the COD portal device to the content provider during order processing.

One advantage of the billing process occurring through the COD portal device 102 is the streamlined nature of this process from the users perspective. This efficiency is even more pronounced if the user 202 orders content from multiple different content providers through the COD portal device 102. The user 202 simply receives one bill per billing period from the entity providing services associated with the portal device, as opposed to several bills from various multiple providers throughout a billing period. This unified billing greatly increases the ease of use by the user 202.

FIGS. 3A-D are example block diagrams for screen displays that can be used to provide to the user 202 information related to the COD portal device 102.

Figure 3A:
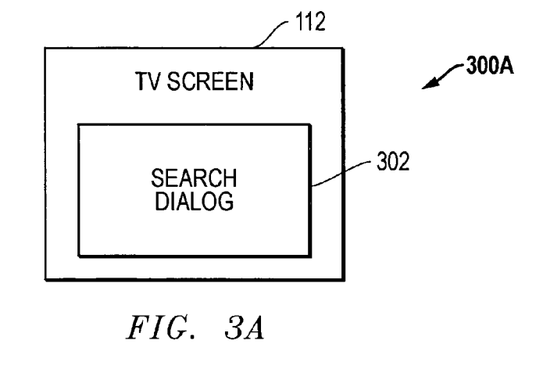
FIG. 3A is an example block diagram of a display including a search dialog.

FIG. 3A is a block diagram for screen display 300A including a search dialogue 302 for a user. The user can interface with the COD portal device 102 through the search dialogue 302 to initiate searches for downloadable media content. For example, a user can use the search dialog 302 to input search terms using an input device 114, such as a remote or a keyboard. The search dialogue can be formulated in any desired fashion. For example, search fields can be provided for items as keywords, actors names, movie titles, order pricing, bandwidth required, screen resolution (e.g., high definition) and/or any other desired search field. Once the user has initiated a search based upon desired search terms and criteria, the COD portal device 102 can interface with the provider sites and/or the portal device server, as described herein, to obtain and process search results from multiple online content providers.

Figure 3B:
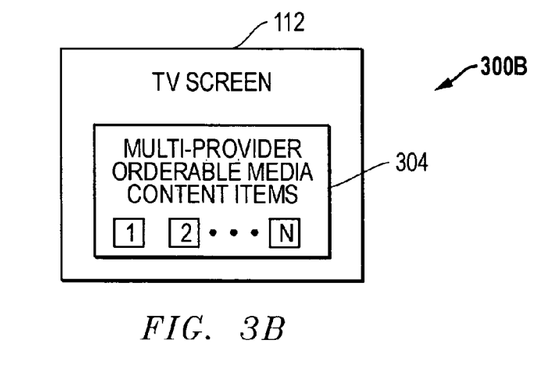
FIG. 3B is an example block diagram of a display including search results of content items.

FIG. 3B is a block diagram for screen display 300B including search results dialogue 304. As depicted, the search results dialogue 304 includes some or all of the content item results from the content search. The search results can be displayed using any organizational structure desired, and these results include one or more items (ITEM 1, ITEM 2 . . . ITEM N) representing multi-provider orderable media content. For example, orderable media content can be organized by price, user rating, critic rating, search ranking and/or any other desired criteria. Thus, the search results from the multiple content providers are aggregated by the COD portal device 102 and organized for display to the user in a streamlined fashion. In addition, the user can be allowed to select how the resulting media content is organized or listed within the search results dialogue 304.

It is noted that the multi-provider orderable media content items 304 (ITEM 1, ITEM 2 . . . ITEM N) displayed will likely be a subset of the entire search results such that the organizational criteria will determine which items are shown first within the results dialogue 304. It is further noted that a scroll feature can be provided to allow a user to move up and down the search results listing. In addition, the search results can be displayed on the display 112 with or without showing the name of the content provider for the content item. Assuming the portal device 102 is handling the transaction processing and the user is being billed through a portal device service company, users will likely be more concerned about price and whether the media content is available based on their search criteria than about the particular content provider that will be providing the content.

Figure 3C:
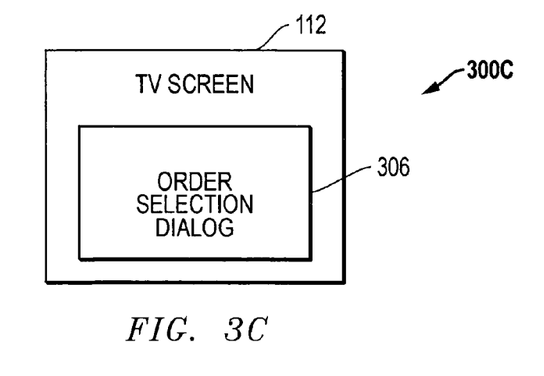
FIG. 3C is an example block diagram of a display including an order selection dialog.

FIG. 3C is a block diagram for screen display 300C including an order selection dialogue 306. The order selection dialog 306 is displayed on the screen 112 to facilitate the users selection and ordering of one or more of the media content items. Again, the user may be allowed to interface with the order selection dialogue 306 using an input device 114, such as a remote. Once a user makes a selection and orders the media content, media content can be downloaded from the media content provider, and the media content can be processed and stored for delivery to the user.

Figure 3D:
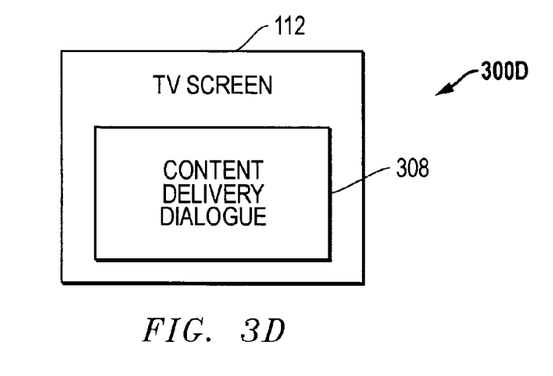
FIG. 3D is an example block diagram of a display including delivered content.

FIG. 3D is a block diagram for a screen display 300D including a playback of the media content through a delivered content dialogue 308. Once the user has selected to view the downloaded media content, the COD portal device 102 facilitates the playback of this content. The content delivery dialogue 308 can provide for playback for the downloaded media content through display 112 based upon user control of the playback. For example, the user can control the playback of delivered content 308 through an input device 114.

Figure 4:
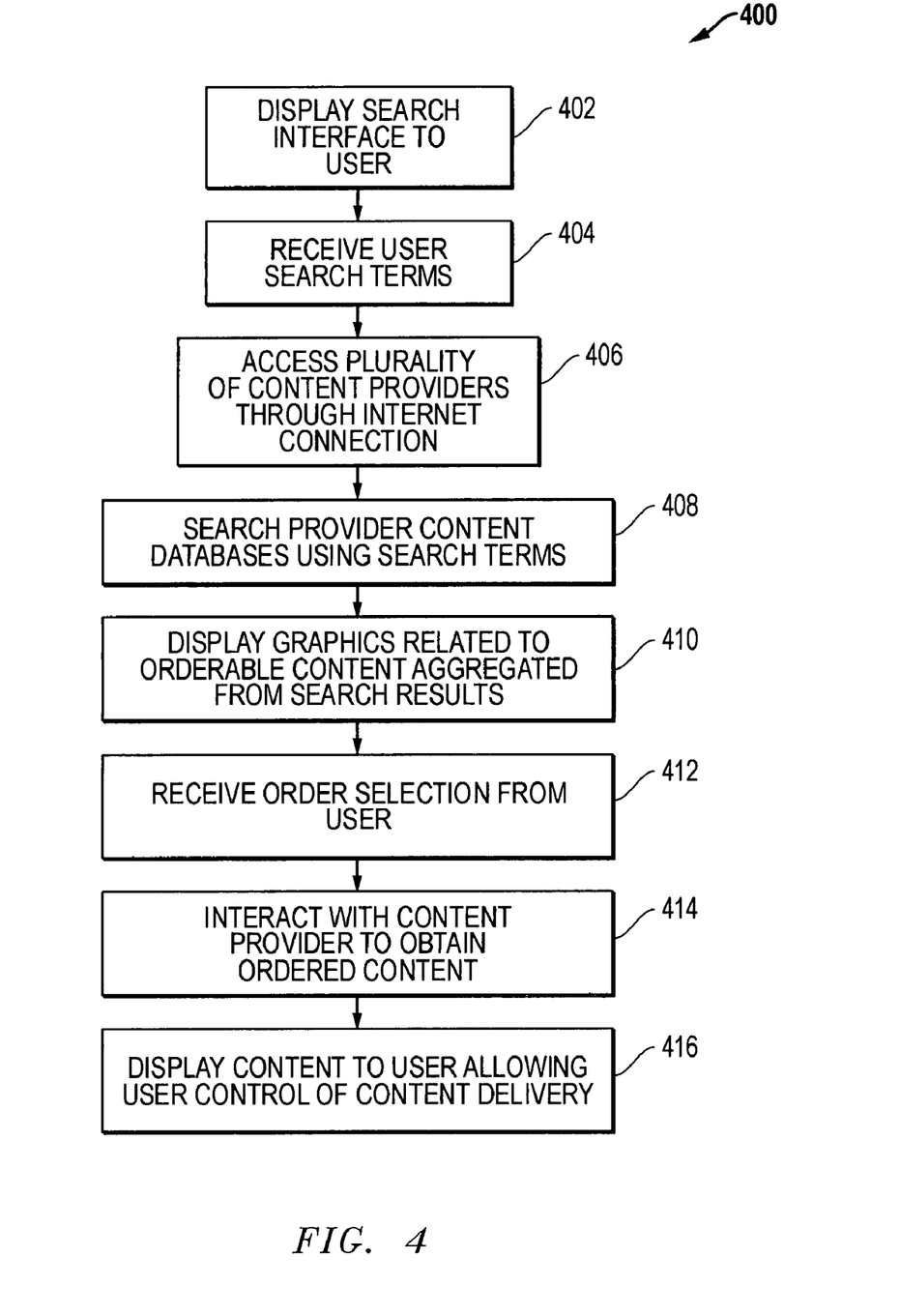
FIG. 4 is an example process flow diagram of the steps involved in a method for providing multi-provider on-demand media content to a user.

FIG. 4 is an example process flow diagram of the steps involved in a method 400 for providing multi-provider on-demand media content to a user. In step 402, the process begins when a search interface is displayed to a user through a display, such as a television screen. In step 404, a user inputs search terms and initiates a search for media content. In step 406, the user search terms are received and used to search content available from a plurality of different media content providers through an Internet connection. In step 408, the media content databases for the content providers are searched using the search terms. In step 410, once the search results are obtained from the plurality of media content providers, the search results are aggregated and organized to display graphics related to one or more items of orderable content. These graphics also provide user selectable options related to the orderable media content items. In step 412, the user makes a selection and orders the download of media content, and the COD portal device receives this order selection from the user. In step 414, the COD portal device interacts with the content provider to obtain the ordered content, for example, by downloading the content through the Internet from one of the media content providers based upon the user selection. In step 416, the downloaded media content is displayed to the user, and the user is allowed to control the delivery of the content.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A method for providing multi-provider media content to a user, comprising:
    displaying on a local display device a search interface to a user;
    receiving search terms from the user;
    accessing a media content provider website having a media content databases through an Internet connection using a local portal device;
    initiating a search of the media content databases through the media content provider website using the search terms;
    obtaining search results from the media content provider website through the Internet connection concerning orderable media content items related to the search terms;
    repeating the accessing, initiating and obtaining steps for one or more additional media content provider websites to obtain a plurality of sets of search results related to the search terms from a plurality of different media content provider websites;
    aggregating the plurality of sets of search results to form aggregated search results;
    displaying through the local display device at least one selectable option representing one or more orderable media content items associated with the aggregated search results;
    receiving a user selection of a selectable option for an orderable media content item;
    downloading media content through the Internet connection from one of the media content provider websites based upon the user selection; and
    displaying on a local display device playback for the downloaded media content.

2. The method of claim 1, further comprising allowing the user to control playback of the downloaded media content.

3. The method of claim 1, further comprising processing an order transaction associated with a selected media content item without requiring the user to interact directly with a content provider for the selected media content item.

4. The method of claim 1, further comprising forwarding user information to a content provider for the content provider to use in processing an order transaction associated with a selected media content item.

5. The method of claim 1, further comprising allowing the user to determine how the search results are organized when displayed.

6. The method of claim 1, wherein the accessing step comprises having the local portal device communicate with a portal device server system that in turn accesses the media content databases through connections to provider websites.

7. The method of claim 1, wherein the displaying step comprises displaying on a television and wherein the receiving step comprises receiving search terms through a television remote.

8. The method of claim 1, wherein the at least one selectable option identifies a content provider that is a source of the orderable media content item.

9. The method of claim 1, wherein the at least one selectable option does not identify a content provider that is a source of the orderable media content item.

10. A portal system for providing multi-provider media content to a user, comprising:
   a user interface module configured to output viewable information to a local display device and configured to receive user input;
   a search module configured to access a plurality of different media content provider websites to search media content databases associated with the plurality of media content provider websites through an Internet connection using user entered search terms, configured to obtain a plurality of different sets of search results from the plurality of different media content provider websites through the Internet connection, configured to aggregate the plurality of different sets of search results from the media content databases to form aggregated search results, and configured to generate at least one user selectable option representing one or more orderable media content items associated with the aggregated search results from the plurality of media content provider websites; and
   a content delivery module configured to download media content through the Internet connection from one of the media content provider websites based upon a user selection of an orderable media content item and configured to display downloaded media content on the a local display device.

11. The portal system of claim 10, further comprising a transaction module configured to process transactions for orders from the user for media content items without requiring the user to interact directly with a content provider.

12. The portal system of claim 10, further comprising a transaction module configured to send information to a content provider related to the user selected content ordered by the user.

13. The portal system of claim 10, further comprising a portal device server configured to communicate with the search module such that the search module accesses the media content databases through the portal device server.

14. The portal system of claim 10, wherein the user interface module is configured to allow the user to determine how the search results are organized when displayed.

15. The portal system of claim 10, further comprising a user input device configured to communicate with the portal system.

16. The portal system of claim 10, wherein the displayed media content items include information about content providers that are sources of the media content.

17. The portal system of claim 10, wherein the displayed media content items do not include information about content providers that is are sources of the media content.

* * * * *

UNITED STATES PATENT AND TRADEMARK OFFICE
CERTIFICATE OF CORRECTION

| | | |
|---|---|---|
| PATENT NO. | : 8,005,721 B2 | Page 1 of 1 |
| APPLICATION NO. | : 11/899565 | |
| DATED | : August 23, 2011 | |
| INVENTOR(S) | : Frank C. Azor et al. | |

It is certified that error appears in the above-identified patent and that said Letters Patent is hereby corrected as shown below:

In claim 17, column 10, line 35, delete "is ."

Signed and Sealed this
Fourth Day of October, 2011

David J. Kappos
*Director of the United States Patent and Trademark Office*